(12) United States Patent  
von Freyhold et al.

(10) Patent No.: US 6,616,345 B2
(45) Date of Patent: Sep. 9, 2003

(54) OPTICAL OR OPTO-ELECTRICAL ARRAY (75) Inventors: Thilo von Freyhold, Jena (DE); Jürgen Wolf, Schlöben (DE); Torsten Scheller, Jena (DE)

(73) Assignee: unique-m.o.d.e. AG, Jena (DE)

( * ) Notice: Subject to any disclaimer, the term of this patent is extended or adjusted under 35 U.S.C. 154(b) by 0 days.

(21) Appl. No.: 09/838,997

(22) Filed: Apr. 20, 2001

(65) Prior Publication Data

US 2002/0186936 A1 Dec. 12, 2002

(30) Foreign Application Priority Data

Apr. 5, 2001 (DE) ......................................... 101 17 018

(51) Int. Cl.[7] ................................................ G02B 6/36
(52) U.S. Cl. ............................. 385/90; 385/52; 385/65; 385/83
(58) Field of Search .............................. 385/90, 52, 65, 385/83, 88, 89; 359/189

(56) References Cited

U.S. PATENT DOCUMENTS

| 4,752,109 A | * | 6/1988 | Gordon et al. ................ 385/14 |
| 4,818,053 A | | 4/1989 | Gordon et al. |
| 4,997,251 A | * | 3/1991 | Hofbauer .................... 385/33 |
| 4,997,279 A | | 3/1991 | Gordon et al. |
| 5,179,609 A | * | 1/1993 | Blonder et al. ............... 385/89 |
| 5,301,251 A | | 4/1994 | Moore et al. ................. 385/91 |
| 5,659,566 A | | 8/1997 | Takemoto ..................... 372/43 |
| 6,290,401 B1 | * | 9/2001 | Tian .......................... 385/88 |

FOREIGN PATENT DOCUMENTS

DE 3433717 A1 3/1986

OTHER PUBLICATIONS

English translation of DE 3433717 A1 Abstract.

* cited by examiner

Primary Examiner—Hemang Sanghavi
Assistant Examiner—Eric Wong
(74) Attorney, Agent, or Firm—Young & Basile, P.C.

(57) ABSTRACT

Optical or optoelectronic array with an assembly holder and an optical or optoelectronic assembly located on it to position the assembly holder on an assembly surface of an optical bench in a way that is movable only in a first plane of adjustment parallel to the assembly surfacewhere the assembly holder has an assembly base for positioning the assembly holder on the assembly surface as well as a seat which is open the entire distance from one outside surface of the assembly holder to the opposite outside surface of the assembly holder in which the optical or optoelectronic assembly is located and which is formed in such a way that the optical or optoelectronic assembly can be moved relative to the assembly holder only in a second plane of adjustment which is non-parallel to the first plane of adjustment, extending parallel to the directional passage of the seat.

79 Claims, 11 Drawing Sheets

OPTICAL OR OPTO-ELECTRICAL ARRAY

BACKGROUND OF THE INVENTION

The present invention relates to a an optical or optoelectronic array of the type used, for example, in optical modules which are used as the source for signals transmitted over optical fibers. By means of modules of this type, light emitted from a semiconductor laser is fed into optical fibers, which is needed, for example, for applications in the areas of telecommunications, pumping lasers, printing and photographic equipment, material processing, medical technology, illumination and display technology, metrology or analytics.

Optical modules of this type are disclosed, for example, in publications U.S. Pat. Nos. 4,818,053 and 4,997,279. Each of them shows an optical bench on which a semiconductor laser, an optical fiber and a focusing lens in a bracket is positioned to transmit the radiation emitted from the semiconductor laser into the optical fiber, where the fiber is held in a fiber sleeve. Both the lens and the optical fiber are aligned longitudinally along the optical axis of the beam emitted by the laser.

The adjustment of the two components is carried out in such a way that first of all the focusing lens is adjusted in three degrees of freedom of translation along the optical axis of the beam emitted by the laser. After the lens has been fixed in position, the optical fiber in turn is adjusted in three degrees of freedom of translation along the optical axis and fixed in position. The disadvantage here is that the adjustment of the two components is performed sequentially in two separate steps. This requires a high degree of sophistication in the equipment as well as the expenditure of a great deal of time.

SUMMARY OF THE INVENTION

The object of the present invention is to make available optical or optoelectronic arrays as well as uses for arrays of this type, with which optical or optoelectronic modules can be constructed and adjusted simply and which ensure precise beam characteristics during their entire life and even under adverse conditions.

This-object is achieved under the optical or optoelectronic array in accordance with claim 1 and also under the use in accordance with claim 27. Advantageous further developments of the array according to the invention or the uses according to the invention are given in the specific dependent claims.

The optical or optoelectronic arrays according to the invention show an assembly holder with an assembly base. The assembly holder can be positioned with the assembly base on an assembly surface of an optical bench. Furthermore, the assembly holder has a full-length open seat for an optical or optoelectronic module. It is vital that the assembly base is constructed in such a way that it is moveable on the assembly surface of the optical bench in a first plane of adjustment parallel to the assembly surface, while the optical or optoelectronic module and the seat of the assembly holder are formed in such a way that the optical or optoelectronic module is moveable only in a second plane of adjustment, not parallel to the first plane of adjustment, ideally perpendicular.

The optical or optoelectronic module can consist of an element holder with optical and/or optoelectronic components located on it.

One configuration of the assembly holder, for example, is a U-section open at the top, between the flanges of which the element holder is located. The distance between the two flanges is dimensioned such that only a small gap remains on both sides of the element holder between the element holder and the flanges. One use of this embodiment under the invention of the optical or optoelectronic array provides for positioning at least one focusing lens and an optical fiber on the element holder in appropriately shaped seats. This array can be set up without any adjustment. The path of the common optical axis of the assembled optical or optoelectronic module is determined by the alignment of the optical axes of the focusing lens, the optical fiber and any other optical and/or optoelectronic components to each other and is therefore dependent on the manufacturing tolerances of the element holder. By adjusting the optical module in up to three degrees of freedom of translation and up to three degrees of freedom of rotation in a single step, the optical axes of the module and of the beam emitted by the laser diode can aligned to each other, and the optimal distance of the laser diode to the optical module can be set. By means of this embodiment of the optical or optoelectronic array according to the invention, it is possible to position all the optical and/or optoelectronic components located on the element holder jointly in the beam path of the light emitted by the laser diode and thus to achieve a simple and correct adjustment of the optical or optoelectronic module.

Advantageously the element holder and the assembly holder are formed in such a way that the element holder is moveable relative to the optical bench in all degrees of freedom.

During the process of adjustment and locking in position, the element holder is held, for example, by a gripping device which is mounted on a positioning system. By means of this positioning system, which can be moved advantageously in 6 axes, the element holder and thus the optical module are adjusted for position. Because of its particular configuration, the assembly holder is moved as well in the first plane of adjustment during the positioning procedure for the element holder, that is to say a subsequent adjustment of the assembly holder is not necessary.

After adjustment has been completed, the element holder can be locked in position in the assembly holder with adhesive, and the assembly holder can be held in position on the optical bench. In this process the element holder is held in position only laterally against the flanges of the assembly holder, and the assembly holder is only held in place by its underside on the assembly surface of the optical bench. The open space between the element holder and the upper side of the base plate of the assembly holder is advantageously not filled with adhesive.

Because of the special configuration of the assembly holder and of the element holder, the gaps between the first element holder and the first assembly holder are extremely narrow, and so only a small gap has to be bridged with adhesive. The result is that material shrinkage of the adhesive during curing is negligible. As a consequence, the adjustment of the element holder in the assembly holder remains unchanged even after the adhesive has cured.

Some examples of optoelectronic arrays under the invention are given in the ensuing descriptions. Similarly, examples of uses of the arrays under the invention, i.e. optical or optoelectronic modules, are to be given.

DESCRIPTION OF THE PREFERRED EMBODIMENT

Figure 1:
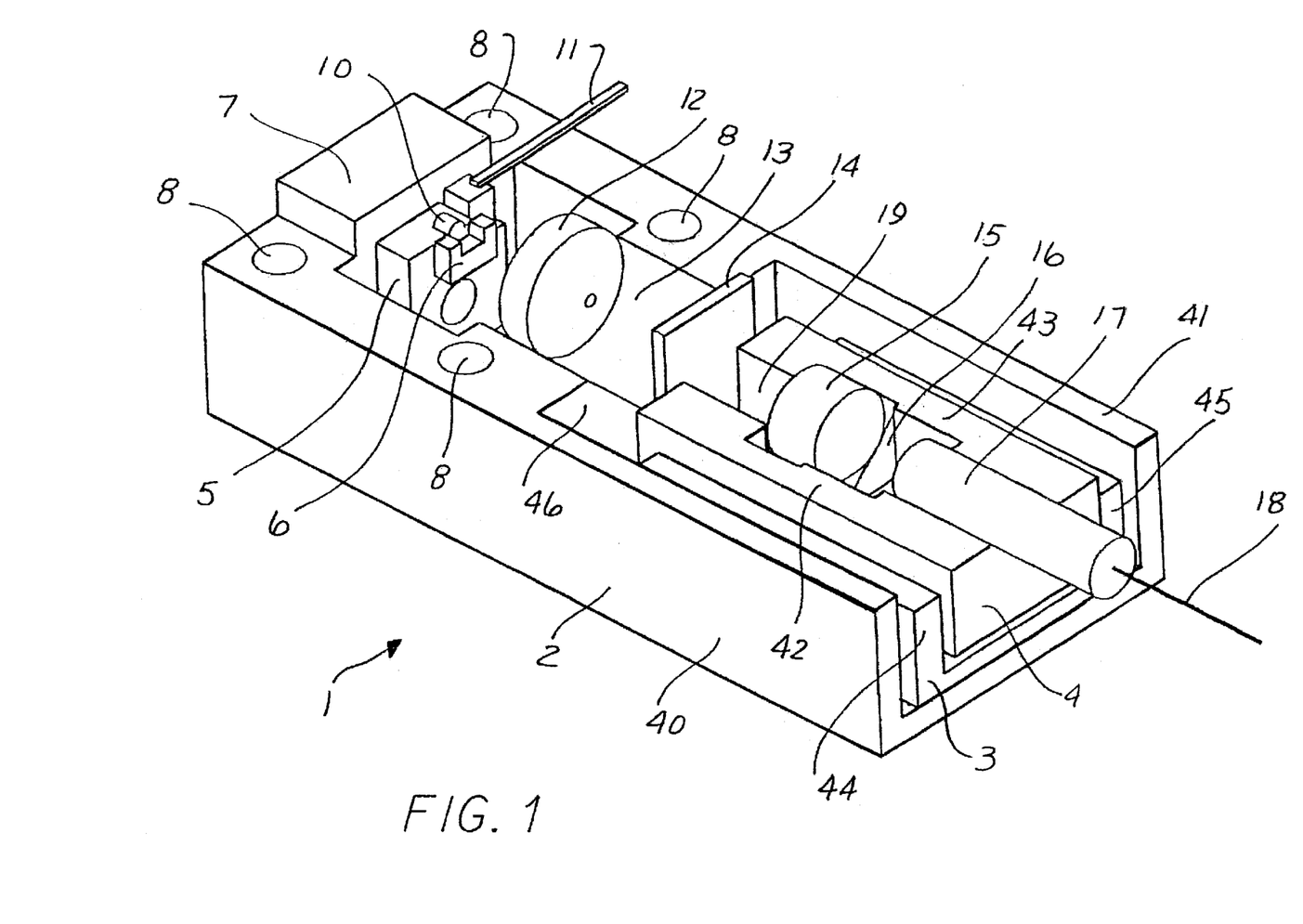
FIG. 1 shows | an optical or optoelectronic module under the invention; |
|

FIG. 1 shows an optoelectronic module 1 with a first optical bench 2 (base element). This first optical bench 2 has a U-shaped section, on the two sides of which flanges 40, 41 form an opening open to the top. This U-section is closed off at the rear by a wall 7 extending between the two flanges 40, 41 and it has a diode bracket 5 on which a semiconductor diode 10 is attached. This semiconductor diode 10 is connected by electrical lead 11 to control and power supply equipment. This laser diode 10 emits light in the direction of the U-section and in this way it defines the beam path of the optoelectronic array. An FAC lens, a Fourier lens 12, a refracting element 14, a focusing lens and an optic fiber 18 are positioned in this optoelectronic array immediately after the semiconductor laser 10. The entire array is adjusted in such a way that the light emitted by the semiconductor laser 10 is injected into the optical fiber 18. The FAC lens is not shown in the present FIG. 1. It is bonded to an FAC holder 6, which is also shaped as a U-section, through whose opening the beam emitted from the semiconductor laser 10 passes. The Fourier lens 12 is located in a recess 13 which in turn is located inside a bridge 46 which runs perpendicular to the U-section between the two flanges 40, 41. In the direction of the beam behind the Fourier lens 12 there is another U-section 3 (assembly holder) running parallel to the U-section of the first optical bench with flanges 44 and 45, in which an element holder, i.e. a second optical bench 4 is located. This optical bench 4 is also essentially shaped in the form of a U-section, through which the light beam emitted by the semiconductor diode 10 passes. A refracting element 14 is bonded to the face of the element holder 4 facing the laser diode 10. In the recess 16 or 26 there is either a focusing lens 15 or a fiber sleeve 17, which encloses the optical fiber 18. The recesses are formed in such a way that the focusing lens 15 and the optical fiber 18 are optimally adjusted to each other.

Under the invention, the element holder 4 is assembled first with the optical elements positioned on it, refracting element 14, focusing lens 15 and optical fiber 18 with fiber sleeve 17. After these elements have been adjusted and attached, adhesively bonded for example, the Fourier lens 12 and the FAC lens are adjusted for position in the optical bench 1 and attached. Then the element holder 4 is placed in the U-section 3 and the U-section 3 is placed in the first U-shaped optical bench 1. The element holder 4 is held with a gripping device and adjusted. As soon as all the optical elements 14, 15 and 18 are optimally positioned in the semiconductor laser beam path, the element holder 4 is bonded in this position into the U-section 3 and the U-section 3 is bonded onto the first optical bench 1.

The optical bench 1 itself can then be bolted into a housing. For this purpose there are bolt holes 8 in the first optical bench 1 through which the bolts can be inserted into a lower housing section and tightened.

Figure 2:
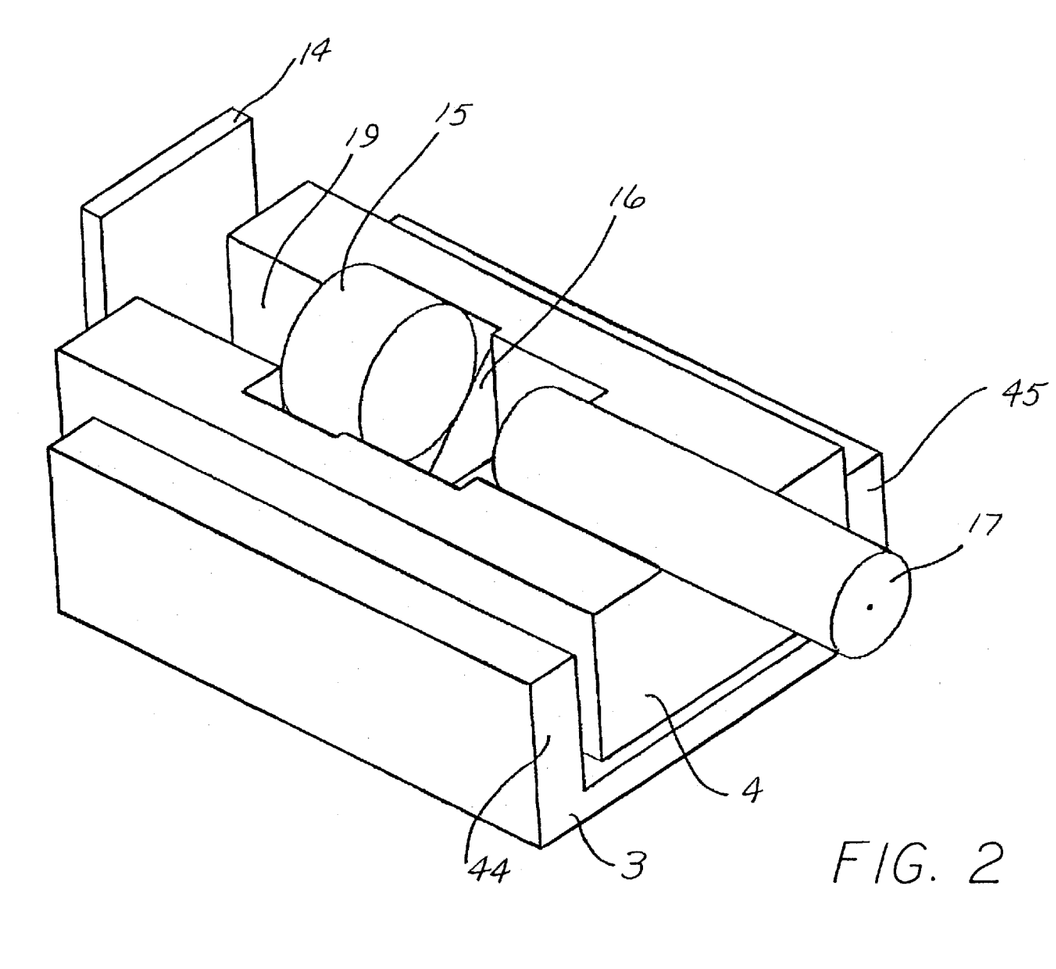
FIG. 2 shows | the element holder as shown in FIG. 1; |
|
Figure 3:
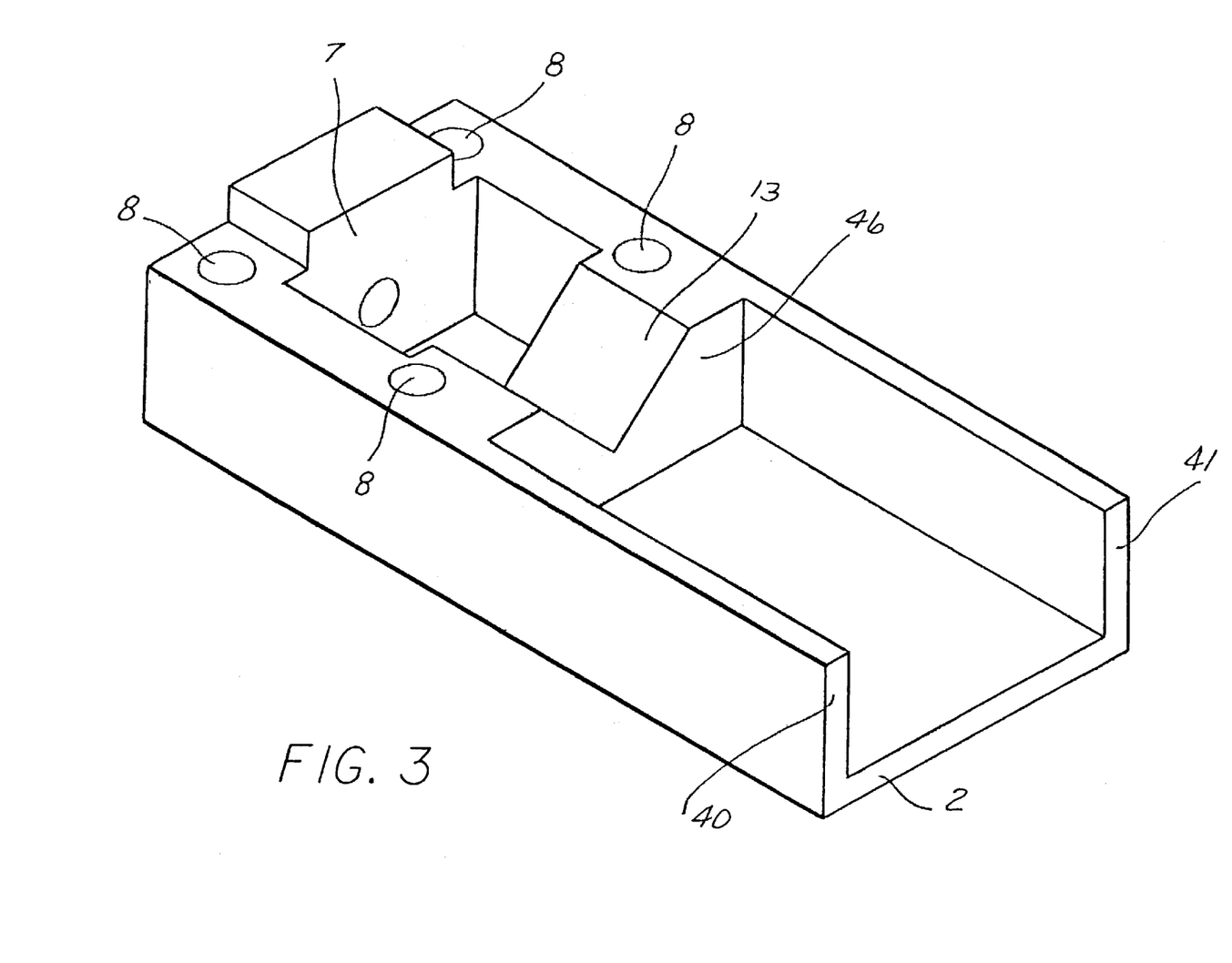
FIG. 3 shows | the first optical bench as shown in FIG. 1; |
|

FIG. 2 shows how the element holder 4 is located within the U-section 3 with its two flanges 44 and 45. Here, as in the following figures, similar reference numerals as in FIG. 1 are used for similar elements.

Figure 4:
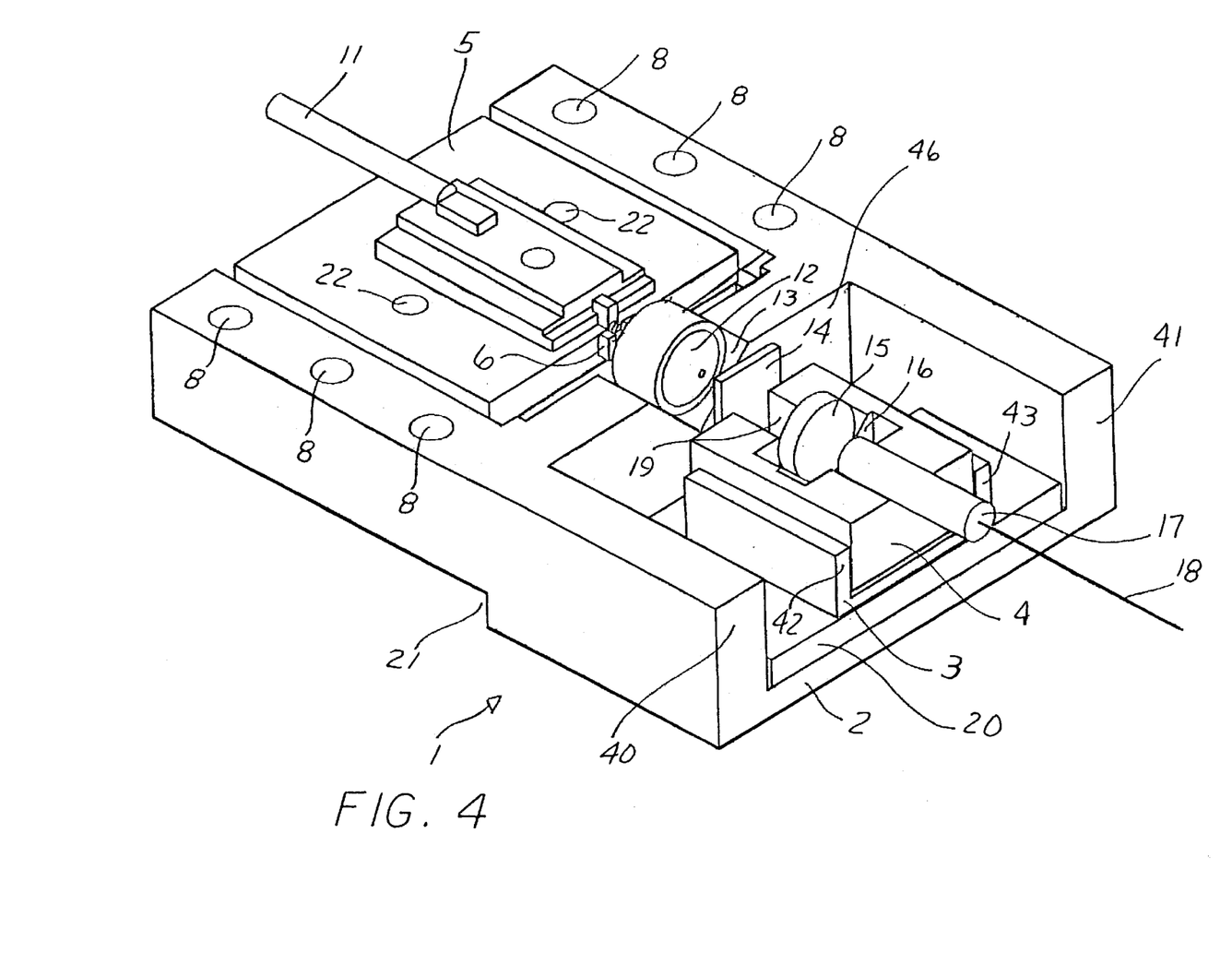
FIG. 4 shows | an additional optoelectronic module; |
|

FIG. 4 shows another example of an optoelectronic module 1 with a primary optical bench 2 (base element) and a second optical bench 4 (element holder). In contrast to FIG. 1, the element holder 4 is now located in a U-section 3 with flanges 42 and 43, which enclose the element holder 4 on both sides, where the U-section 3 for its part is located on a assembly plate 20 (assembly base), which is located between the two flanges 40 and 41 of the U-shaped area of the first optical bench 2. Here too another bridge 46, which has a V-shaped recess 13 to position Fourier lens 12, extends between the two flanges 40 and 41. The semiconductor diode is now located on a diode holder 5, which is attached to the first optical bench 2 by means of bolt holes 22. The first optical bench 2 has a step 21 on its underside, shaped in such a way that the underside of the first optical bench 2 is higher in the area of the laser diode than in the area of the second optical bench 4. The effect of this step 21 is that a cooling element, for example a Peltier element, can be attached from below to the first optical bench 2 in the area of the laser diode, where, if the height of the step and the height of the Peltier element coincide, the underside of the optical bench runs flush and even with the Peltier element. A space for thermal insulation, which can be filled with a stability-promoting, thermally insulating material, should always be left between the underside of the first optical bench 1 and the bottom of a housing.

Figure 5:
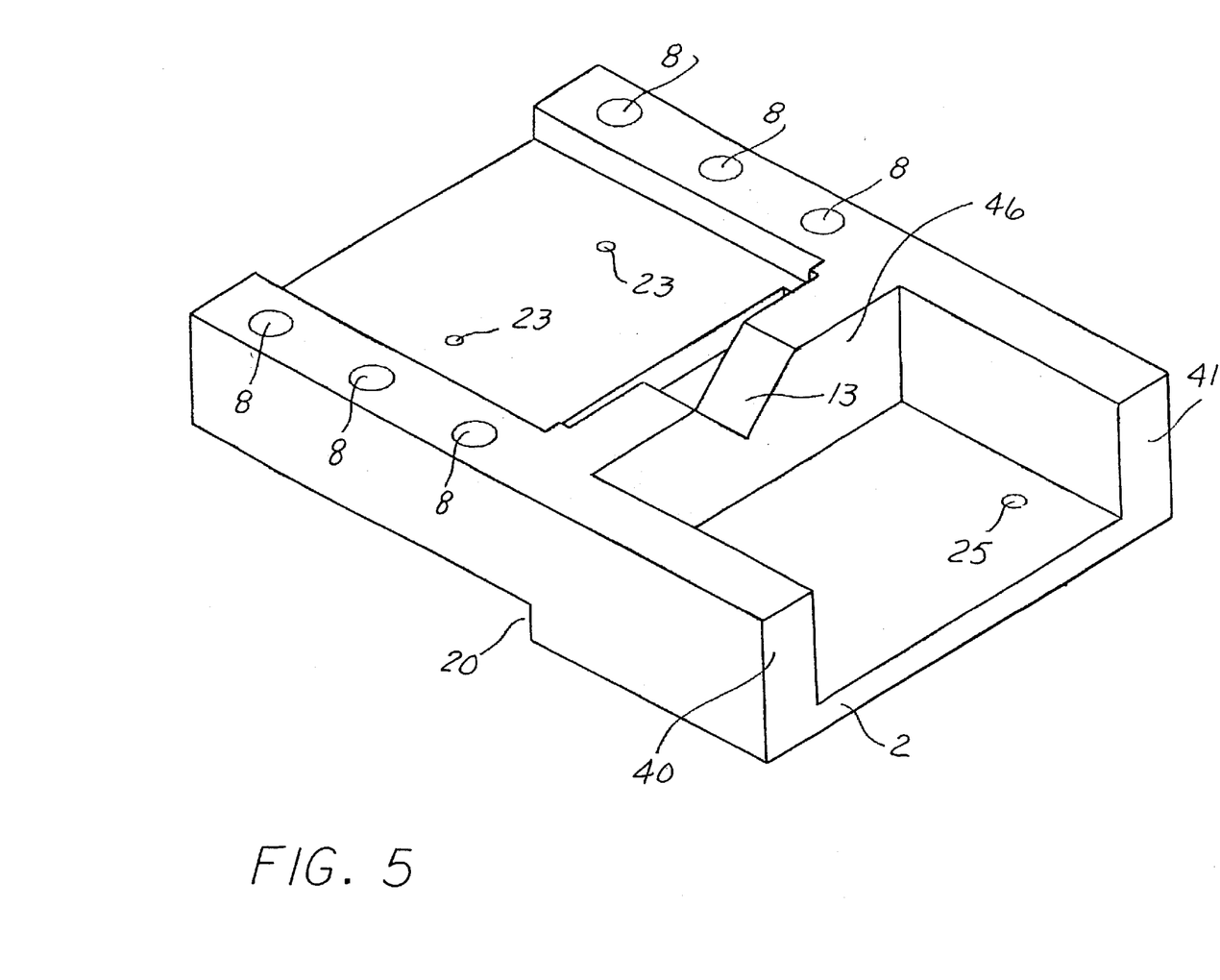
FIG. 5 shows | the first optical bench as shown in FIG. 4; |
|

FIG. 5 shows the first optical bench 2, where the corresponding bolt holes 23 can now be seen, which match the bolt holes 22 in the diode holder 5. In the same way, bolt holes 25 can be seen, by means of which the assembly base 20 in the first optical bench can be attached in the first optical bench.

Figure 6:
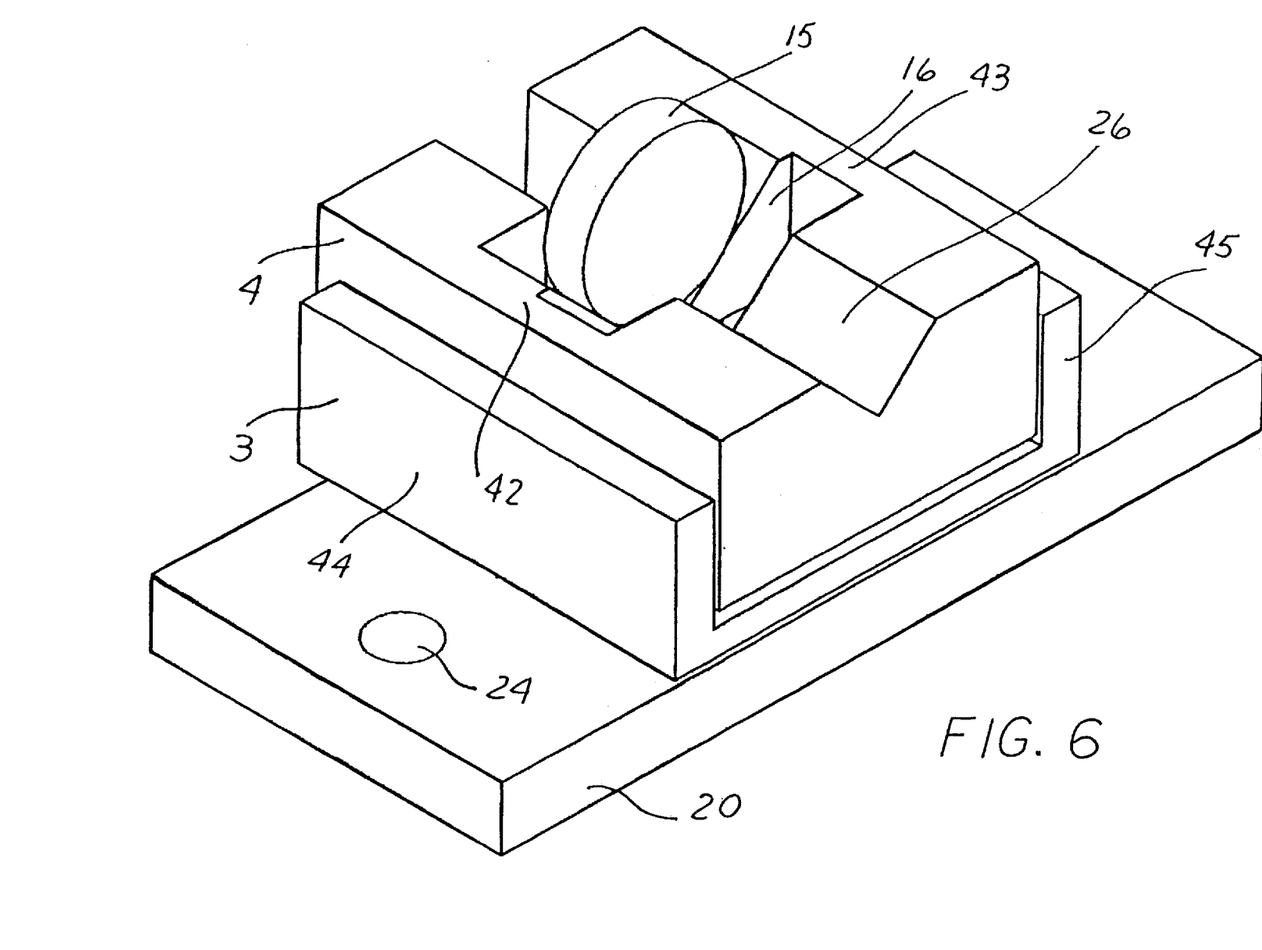
FIG. 6 shows | the element holder as shown in FIG. 4; |
|

FIG. 6 shows the assembly base 20 with its bolt holes 24, which match the bolt holes 25. The U-section 3 and the second optical bench 4 are located on this assembly base, where the second optical bench 4 and the U-section 3 are dimensioned in such a way that the second optical bench 4 is partially enclosed on its two long sides, viewed in the direction of the beam, by the flanges 44 and 45 of the U-section 3. The rest of the construction of the second optical bench 4 is as described previously under FIG. 2. In FIG. 6 only the focusing lens 15 is shown in its mount 16, while the refracting element 14 and the fiber sleeve 17 are not shown.

Figure 7:
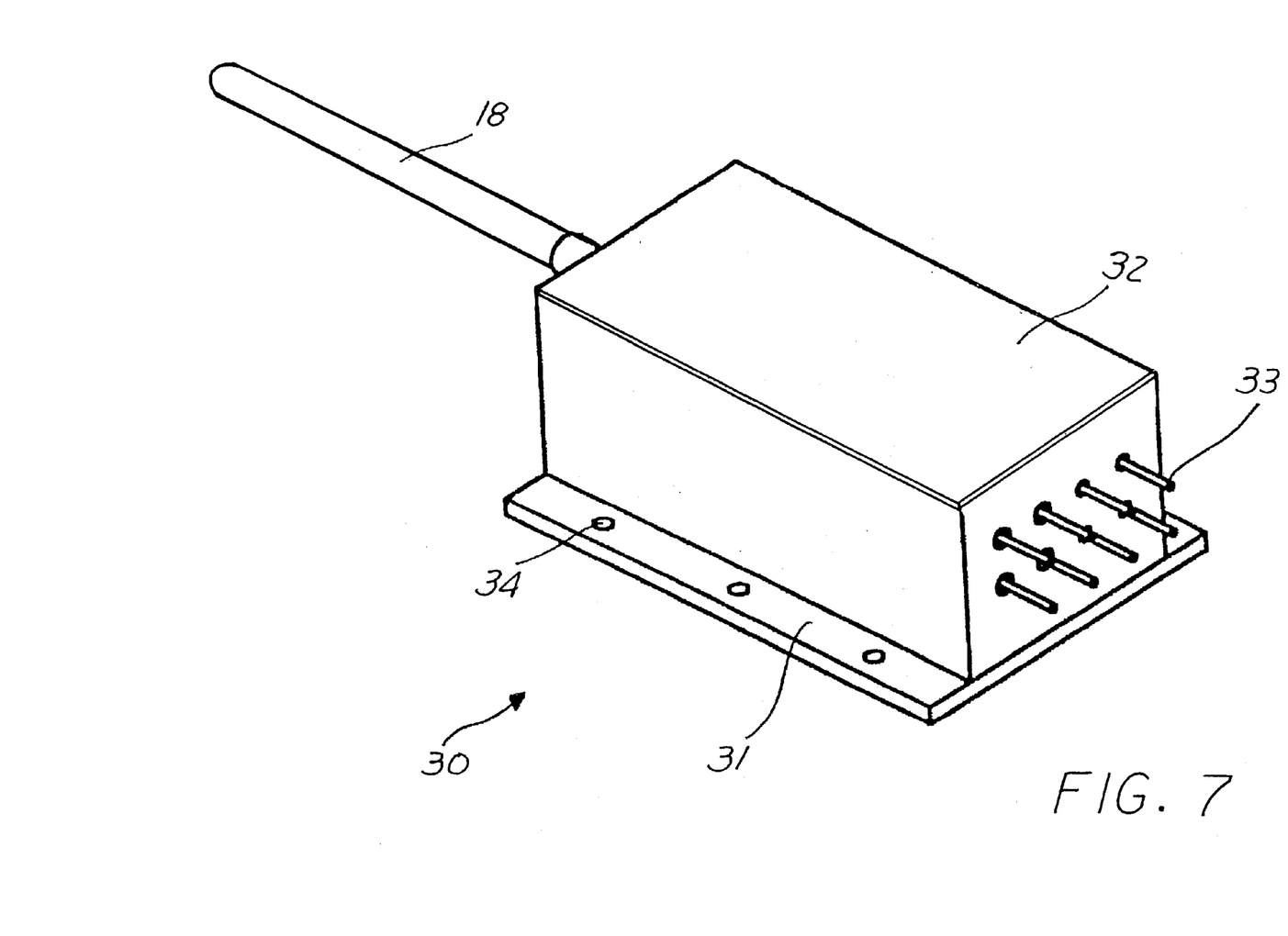
FIG. 7 shows | the housing of an optoelectronic module under the invention; |
|

FIG. 7 shows a housing of the type that can be used for an optoelectronic component according to the invention. This housing 30 has a housing base 31, consisting of a base plate, on which there is a housing cover 32, and four side pieces. The base plate of the housing base 31 has bolt holes 34, which can be used to bolt the housing 30 securely to a supporting base. In addition, the housing base 31 has lateral openings through which the optical fiber 18 is run on one side and the electrical leads 33 to the laser diode are run on the opposite side. The housing cover 32 is hermetically attached to the housing base, for example by means of welding or soldering. If the openings of the passages are properly sealed and the interior of the housing 30 is filled with inert gas, the result is a completely maintenance-free and very long-lived optoelectronic component.

Figure 8:
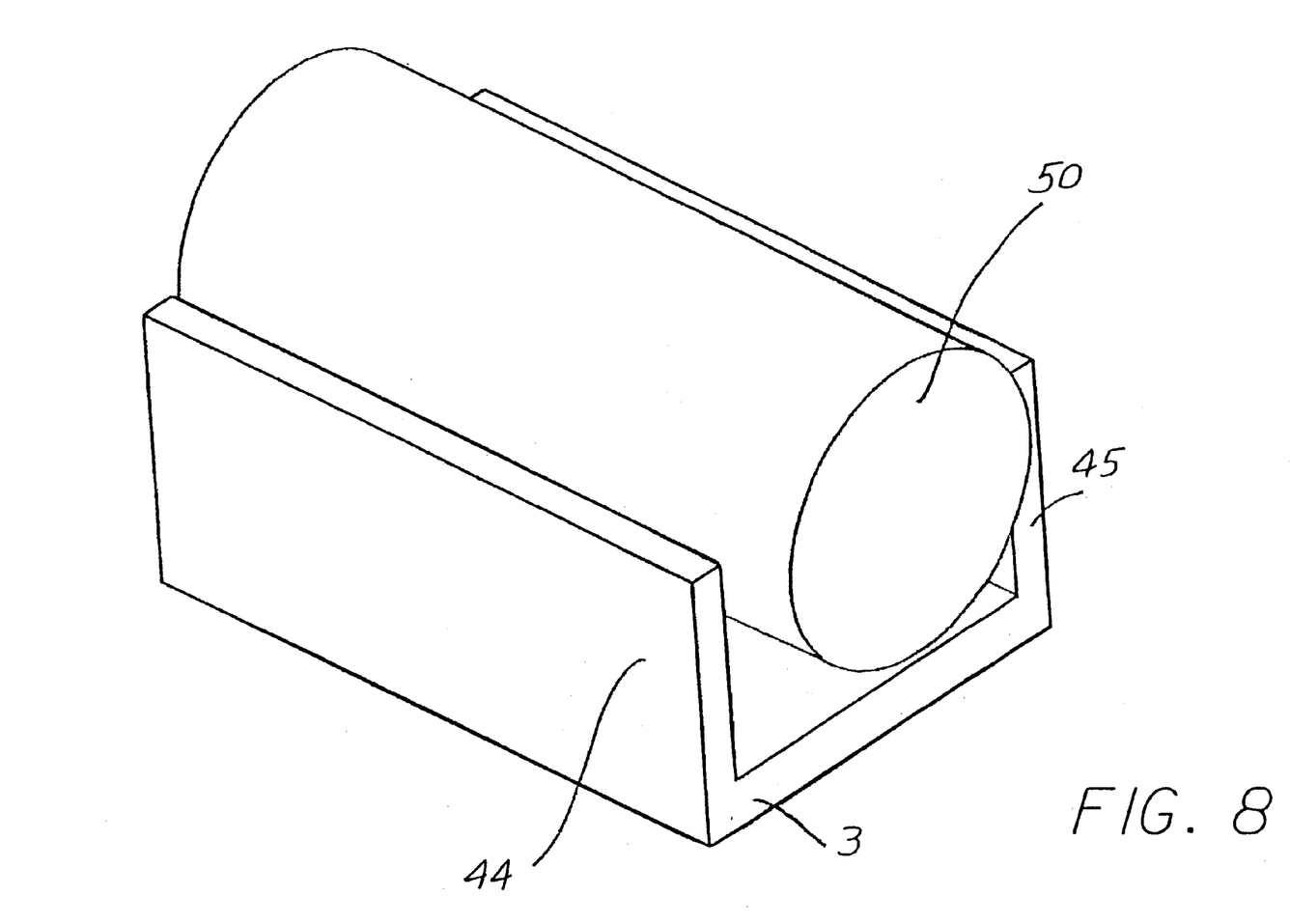
FIG. 8 shows | the assembly holder under the invention with optical or optoelectronic assembly; and |
|

FIG. 8 shows an assembly holder 3, on which a schematically indicated optical module 50 is located. The assembly holder 3 has a U-shape, where the two flanges 44 and 45 have sufficient distance between them that the optical module 50 with a predetermined diameter can be positioned between them.

Figure 9A:
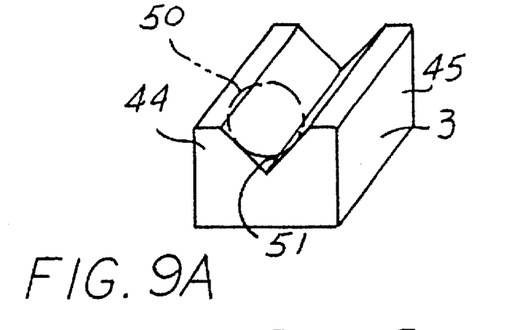
FIGS. 9A–9X show | additional assembly holders under the invention. |
Figure 9B:
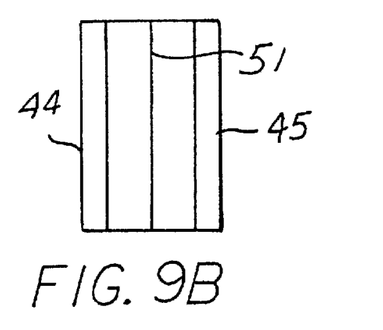
Figure 9C:
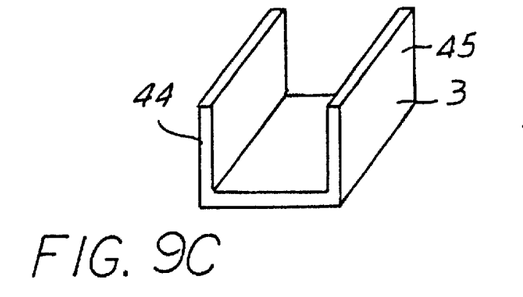
Figure 9D:
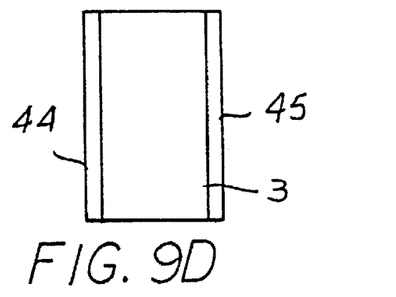
Figure 9E:
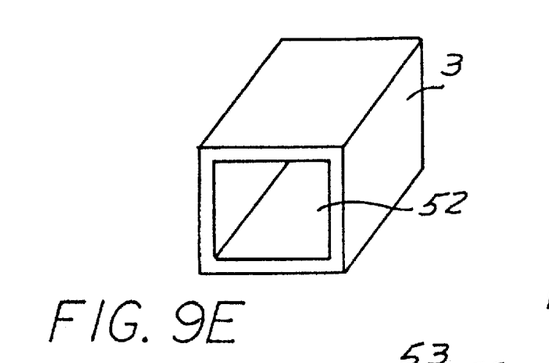
Figure 9F:
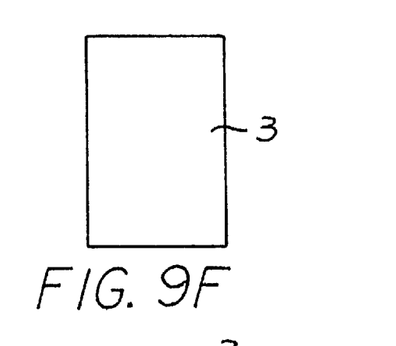
Figure 9G:
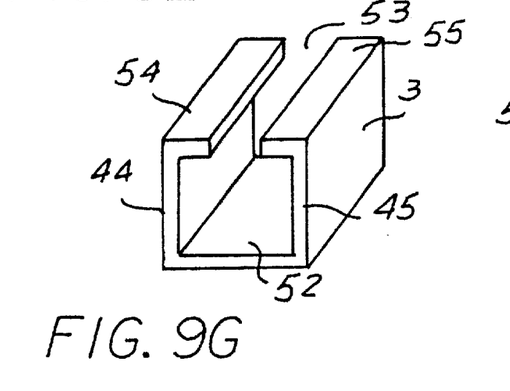
Figure 9H:
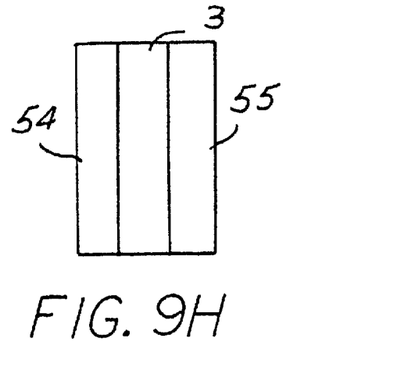
Figures 9I, 9J:
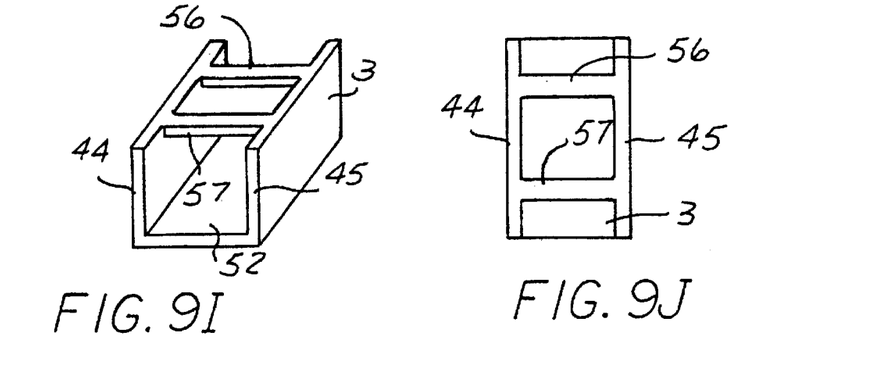
Figure 9K:
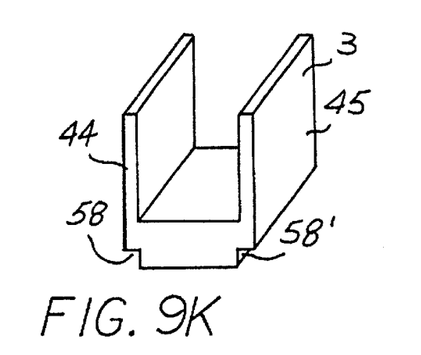
Figure 9L:
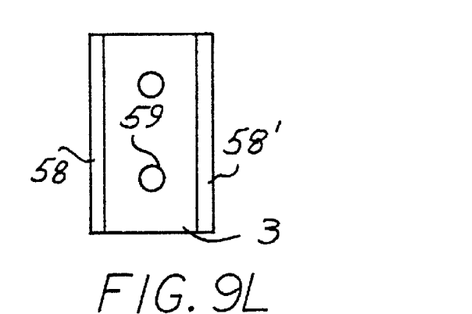
Figure 9M:
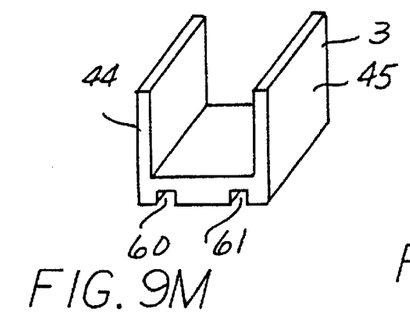
Figure 9N:
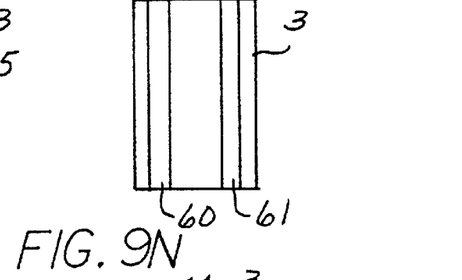
Figure 9O:
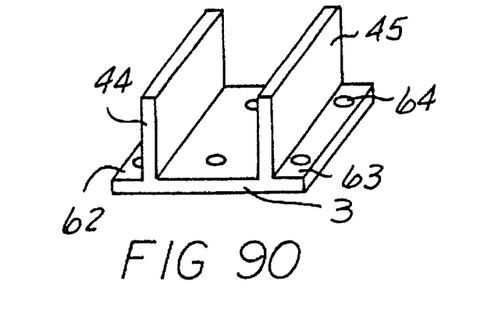
Figure 9P:
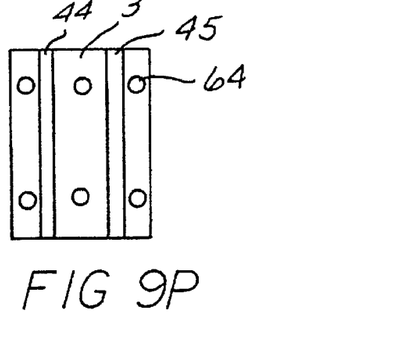
Figure 9Q:
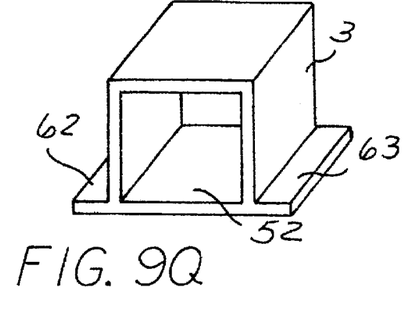
Figure 9R:
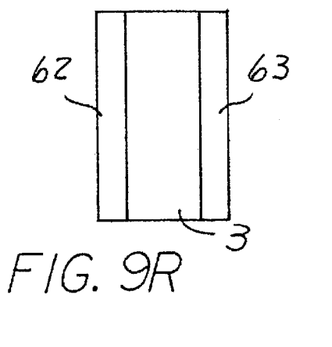
Figure 9S:
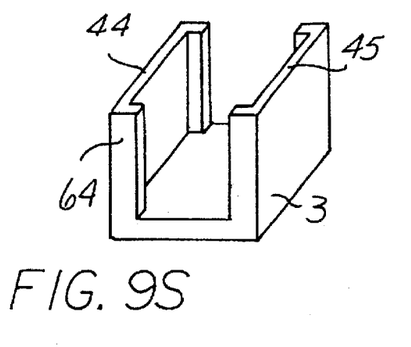
Figure 9T:
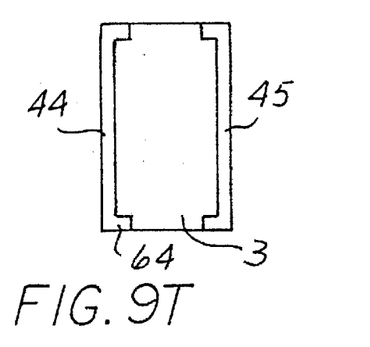
Figure 9U:
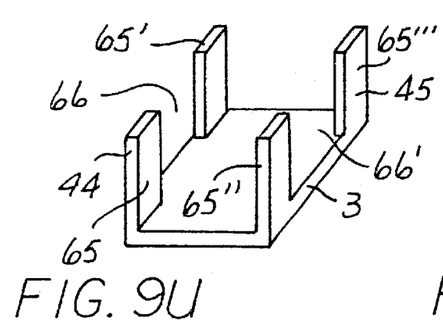
Figure 9V:
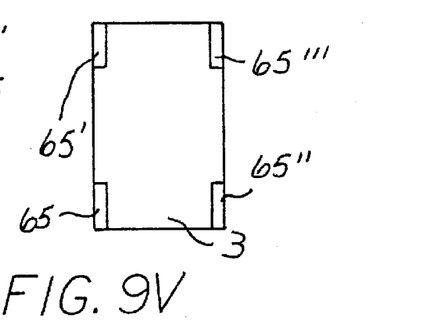
Figure 9W:
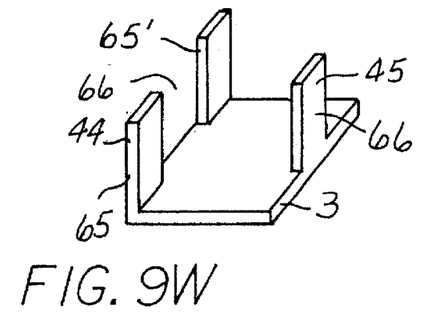
Figure 9X:
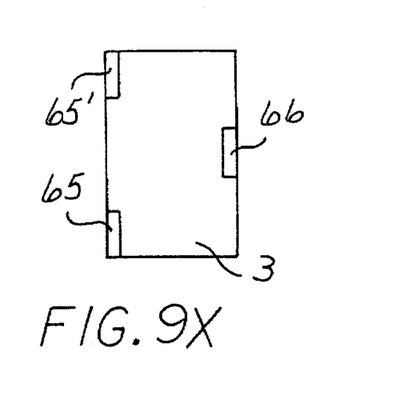

FIGS. 9A–9X show different forms of the assembly holder 3 according to the invention.

FIGS. 9A and 9B show an assembly holder 3 with two flanges 44 and 45, extending between which is a V-shaped notch. This V-shaped notch 51 positions an assembly 50 (shown in phantom) with a cylindrical external shape. The V-shaped notch extends from one end of the assembly holder 3 to the other end, where the assembly 50 can be rotated around its cylindrical axis in this V-shaped lengthwise opening. In FIG. 9A an isometric view of the assembly holder is shown. FIG. B shows a top view of the assembly holder.

FIG. 9C shows the assembly holder 3 in the shape of a U-section with flanges 44 and 45, where FIG. 9D shows a top view.

In FIG. 9E the assembly holder 3 has the shape of a square tube with a lengthwise opening 52 running from one end of the assembly holder 13 to the other end in the axial direction. In the partial illustration in FIG. 9F, a top view of this assembly holder 3 is shown.

FIG. 9G shows an assembly holder which also has the same basic shape of a square tube as shown in FIG. 9E. In contrast to FIG. 9E, the square tube is not completely closed in the horizontal axial direction, but has an opening 53 connecting the lengthwise passage 52 to the outside. A gripping device can be inserted through this opening 53 in order to hold the optical or optoelectronic component in position in the assembly holder during adjustment and attachment to the assembly holder. In each instance only one flange 54 and 55 remains of the top periphery of the assembly holder 3. FIG. 9H shows a top view of the assembly holder 3.

FIG. 9I shows a U-shaped assembly holder 3, as depicted in FIG. 9C where however the two flanges 44 and 45 are connected to each other by means of cross-bridges 56, 57 which run perpendicular to the axial direction from one lip of one flange 44 to the lip of flange 45. Openings remain between the two bridges 57, 57 or adjacent to them, through which a gripping deice can be inserted. The assembly holder from FIG. 9I of which a top view is shown in FIG. 9J, can also be lifted from a magazine together with the assembly being held by means of the gripping device in the lengthwise opening formed by the flanges 44 and 45 and placed on the assembly surface.

FIGS. 9K–9N also show U-shaped assembly holders 3, as in FIG. 9E in isometric view FIGS. 9K and 9M and viewed from below. FIGS. 9L and 9N, respectively. The underside of the assembly holder is non-planar and has, for example in FIGS. 9M and 9N, channels 60 and 61 running in the axial direction, or in FIGS. 9K and 9L rabbets 58, 58[1] running in the axial direction. As is shown in FIG. 9L two or three countersunk holes 59 are provided on the underside of the assembly holder, which for example act as soldering reservoirs or for holding adhesive.

FIG. 9O similarly shows a U-shaped section 3 as an assembly holder, where the base of the U-section projects at the sides of the two flanges 44 and 45. These projections 62, 63 have furthermore vertical passages or vertical counterbores 64 on their upper side, which also make attachment of the assembly holder to the surface easier, for example by being filled with adhesive or solder or by spot welding.

This is also shown in FIG. 9P as a bottom view of the assembly holder 3. FIG. 9Q shows an assembly holder as in FIG. 9E where in this instance however the underside of the assembly holder also projects beyond the two side walls of the square section. These projections 62, 63 can also be seen in the top view of FIG. 9R.

As can be seen in FIG. 9S the inner side of the passage, i.e. the inner side of the flanges 44, 45 can be non-planar. In FIG. 9S the flanges 44, 45 have extensions 64 at their at each of their axial end surfaces. This can also be seen in the FIG. 9T, the top view of the assembly holder 3.

FIG. 9U–9X also show U-shaped assembly holders 3, where however the flanges 44, 45 have openings 66, so that upright flange pieces, 65, 65', 65", and 65''', are standing only at the four corners of the base plate of the assembly holder 3. In FIG. 9W two flange pieces 65, 65' remain from the flange 44 on one side of the assembly holder 3, while from the right flange 45 only the center piece which is located opposite the opening 66 remains In this way better accessibility is created for holding an optical optoelectronic component in place. Top views of FIG. 9U and 9W are shown in FIGS. 9V and 9X respectively.

The examples from FIGS. 9A to 9X are intended solely as exemplars, while it must be pointed out that any combination at all of the elements shown are there with each other is possible.

What is claimed is:

1. Optical or optoelectronic array with an assembly holder and an optical or optoelectronic assembly located on it to position the assembly holder on an assembly surface of an optical bench in a way that is movable only in a first plane of adjustment parallel to the assembly surface where the assembly holder has an assembly base for positioning the assembly holder on the assembly surface as well as a seat which is open the entire distance from one outside surface of the assembly holder to the opposite outside surface of the assembly holder, in which the optical or optoelectronic assembly is located and which is formed in such a way that the optical or optoelectronic assembly can be moved relative to the assembly holder only in a second plane of adjustment which is non-parallel to the first plane of adjustment, extending parallel to the directional passage of the seat.

2. Array in accordance with the previous claim, wherein the optical or optoelectronic assembly is at least one of movable and rotatable.

3. Array in accordance with claim 1, wherein the optical or optoelectronic assembly can be moved relative to the assembly holder only in a second plane of adjustment which is perpendicular to the first plane of adjustment, extending parallel to the directional passage of the seat.

4. Array in accordance with claim 1, wherein the seat is formed as a passage.

5. Array in accordance with claim 1, wherein the underside of the assembly base opposite the seat is formed as a flat surface or at least as a 3-point contact.

6. Array in accordance with claim 1, wherein the inner side of the seat and/or the underside of the assembly base opposite the seat is non-planar.

7. Array in accordance with claim 1, wherein at least one of the inner side of the seat and the underside of the assembly base opposite to the seat has cavities.

8. Array in accordance with claim 1, wherein the cavities are formed as grooves.

9. Array in accordance with claim 1, wherein the cavities on at least one of the inner side of the seat and on the underside of the assembly base are filled or can be filled with solder or adhesive.

10. Array in accordance with claim 1, wherein the seat is formed in such a way that the optical or optoelectronic assembly can be rotated around the optical axis of the component in its installed condition in the seat.

11. Array in accordance with claim 1, wherein the seat is formed in such a way that modules with an outside contour which is essentially rectangular or cylindrical, at least in sections can be positioned in or against it.

12. Array in accordance with claim 1, wherein the assembly holder has a U-section open to the top with a floor and two lateral flanges extending parallel to the directional passage of the seat, where both flanges together with the floor enclose and form the passage on at least three sides.

13. Array in accordance with claim 1, wherein the assembly base is formed at least partially by the floor of the U-section.

14. Array in accordance with claim 1, wherein the assembly base in the plane of the floor extends laterally beyond the two flanges.

15. Array in accordance with claim 12, wherein at least two cross-bridges extend between the two facing longitudinal edges of the two flanges of the U-section.

16. Array in accordance with claim 12, wherein one or both flanges of the U-section are indented in one or more places in the transitional direction.

17. Array in accordance with claim 1, wherein the assembly holder has a square tube open on two opposite sides, whose outer walls define a passage as seat.

18. Array in accordance with claim 17, wherein the assembly base extends laterally beyond the outer walls of the square tube.

19. Array in accordance with claim 17, wherein the square tube has at least one opening along the seat.

20. Array in accordance with claim 1, wherein the assembly base has at least one of vertical bolt holes and indentations on its underside.

21. Array in accordance with claim 20, wherein the at least one of indentations and bolt holes on the underside of the assembly base are filled or can be filled at least partially with at least one of solder and/or adhesive.

22. Array in accordance with claim 1, wherein the assembly holder or the optical or optoelectronic assembly is coated or can be coated at least partially with solder.

23. Array in accordance with claim 22, wherein the assembly holder is coated or can be coated with solder in at least one of the area of the seat and in the area of the assembly base.

24. Array in accordance with claim 1, wherein the optical or optoelectronic assembly is attached to the assembly holder by at least one of cementing, soldering, welding, bonding, clamping and press fitting.

25. Array in accordance with claim 1, wherein the assembly holder is attached to the assembly surface by means of at least one of cementing, soldering, welding, bonding, clamping and press fitting.

26. Array in accordance with claim 1, wherein the optical or optoelectronic assembly contains at least one optical and optoelectronic elements or is an optical or optoelectronic module.

27. An array in accordance with claim 1 in an optical or optoelectronic module with
   an optical bench and a laser diode located on its upper side or group of laser diodes and
   in the direction of a primary beam of at least one of laser diodes, and at least one of first optical and optoelectronic elements positioned one behind the other, which comprise at least one focusing lens as well as an optical fiber with two optical end surfaces,
   where the first optical and/or optoelectronic elements are located in or against a first element holder and together with the first element holder form a first optical or optoelectronic module,
   a first assembly holder is located on the upper side of the optical bench, the first optical or optoelectronic elements on the element holder can be adjusted together to be in the beam path of the light emitted by at least one laser diode, and the element holder is located on the assembly carrier in such a way that the first optical or optoelectronic element located in or on the first element carrier are in the beam path of the light emitted by at least one laser diode and the focusing lens beams light emitted from at least one laser diode into the first optical end surface of the optical fiber.

28. The array in accordance with claim 27, wherein additional optical or optoelectronic elements, besides the focusing lens and the optical fiber, are located in or against the first element holder.

29. The array in accordance with claim 27, wherein several or all of the optical and/or optoelectronic elements assigned to an element carrier are fixed in position in or on the element carrier, before the element holder is inserted into the assembly holder.

30. The array in accordance with claim 27, wherein additional optical benches with laser diodes are provided, which are in optical contact with the optical bench named.

31. The array in accordance with claim 27, wherein the first element holder and the first assembly holder are formed in such a way that the element holder, with the first optical or optoelectronic modules located in or against it, is adjustable in at least one degree of freedom of translation and one degree of freedom of rotation with respect to the beam emitted by at least one laser diode.

32. The array in accordance with claim 31, wherein the first element holder and the first assembly holder are formed in such a way that the first optical or optoelectronic modules located in or on the first element holder can be adjusted in at least three degrees of freedom of translation and two degrees of freedom of rotation with respect to the beam emitted from at least one laser diode.

33. The array in accordance with claim 31, wherein the first element holder and the first assembly holder are formed in such a way that the element holder, together with the optical or optoelectronic modules located in or on it, can be adjusted in two degrees of freedom of translation and two degrees of freedom of rotation with respect to the beam emitted from at least one laser diode.

34. The array in accordance with claim 31, wherein the first element holder and the first assembly holder are formed in such a way that the element holder, together with the first optical or optoelectronic modules located in or on it, is adjustable in three degrees of freedom of translation and two degrees of freedom of rotation with respect to the beam emitted by at least one laser diode.

35. The array in accordance with claim 27, wherein at least one of additional optical and optoelectronic elements are located in the beam path of the light emitted by at one least one laser diode.

36. The array in accordance with claim 27, wherein the optical bench has seats on its top side, in which at least one additional optical or optoelectronic modules, assembly holders and element holders can be located or are located.

37. The array in accordance with claim 36, wherein the seats are formed as at least one of plane bearing surfaces, stepped seating surfaces or rectangular, cylindrical, V-shaped recesses and U-shaped recesses.

38. The array in accordance with claim 36, wherein the additional optical or optoelectronic components are located at least partially in at least one of the first and several additional element holders, which in turn are located on the optical bench.

39. The array in accordance with claim 38, wherein the additional element holders are located in seats on at least one of the optical bench and are located by means of additional assembly holders on the optical bench.

40. The array in accordance with claim 27, wherein at least one of the first and additional element holders have seats, in which at least one of the first and additional optical and optoelectronic elements are at least partially located.

41. The array in accordance with claim 27, wherein at least one of the first and additional element holders have seats for additional element holders, in or on which in turn additional optical or optoelectronic elements are located.

42. The array in accordance with claim 40, wherein the seats of the at least one of the first and additional element holders are formed at least partially as at least one of plane bearing surfaces, stepped seating surfaces or rectangular, cylindrical, V-shaped recesses and U-shaped recesses.

43. The array in accordance with claim 27, wherein the seats are formed in such a way that modules having basically at least in sections at least one of a square and cylinder-shaped outer contour can be positioned in or on them.

44. The array in accordance with claim 43, wherein at least one of the first and the at least one additional element holder are formed as cylindrical tubes with the interior area of the tubes as a seat.

45. The array in accordance with claim 27, wherein the optical and/or optoelectronic elements are held in position by at least one of the at least one element holder and in their seats by at least one of cementing, soldering, welding, bonding, clamping and press fitting.

46. The array in accordance with claim 27, wherein at least one of the optical bench, at least one of the first and at least one additional element holder and at least one of the first and the at least one additional assembly holder are attached to each other at least partially by at least one of cementing, soldering, welding, bonding, clamping and press fitting.

47. The array in accordance with claim 27, wherein the optical fiber is located on or in the element holder in the area of its first optical end surface.

48. The array in accordance with claim 27, wherein the optical fiber is at least partially enclosed by one or more sleeves.

49. The array in accordance with claim 48, wherein the optical fiber is attached at least partially to at least one of the one and several sleeves by means of at least one of cementing, soldering, welding, bonding, clamping and press fitting.

50. The array in accordance with claim 49, wherein the optical fiber is enclosed by a sleeve in the area where it seats on the element holder.

51. The array in accordance with claim 49, wherein the optical fiber is at least one of hermetically sealed to the sleeve and the sleeve is hermetically sealed to the element holder.

52. The array in accordance with claim 51, wherein the sleeve is attached to the element holder by at least one of cementing, soldering, welding, bonding, clamping and press fitting.

53. The array in accordance with claim 27, wherein an FAC lens is positioned immediately ahead of the primary emitting surface of at least one laser diode and in the beam path of the beam emitted by at least one laser diode.

54. The array in accordance with claim 53, wherein the FAC lens is positioned via a carrier in front of at least one laser diode.

55. The array in accordance with claim 54, wherein the carrier has a U-shape enclosing a recess on the sides, and the FAC lens is located on the holder covering one of the surfaces of the recess surrounded by the two U-shapes.

56. The array in accordance with claim 55, wherein U-shaped carrier is located in front of the laser diode in such a way that the beam emitted by the laser diode passes through the recess.

57. The array in accordance with claim 54, wherein the carrier has a step in which the FAC lens is located.

58. The array in accordance with claim 54, wherein at least one of the FAC lens is attached to the carrier and the carrier is attached in front of the laser diode by at least one of cementing, soldering, welding and bonding.

59. The array in accordance with claim 27, wherein the optical bench has a step on its underside running perpendicular to the direction of the beams emitted by at least one laser diode in such a way that the underside of the optical bench sits lower behind the step in the direction of the beam than in front of the step.

60. The array in accordance with claim 59, wherein the step viewed in the direction of the beam is located in the area between the laser diode and the element holder.

61. The array in accordance with claim 59, wherein a temperature-regulating device is located on the underside of the first optical bench in the direction of the beam ahead of the step.

62. The array in accordance with claim 61, wherein the thickness of the temperature-regulating device is greater than the step height.

63. The array in accordance with claim 60, wherein the temperature-regulating device has a thermoelectric element, for example a Peltier element.

64. The array in accordance with claim 27, characterized by a temperature sensor to determine the temperature of the optical bench.

65. The array in accordance with claim 64, wherein the temperature sensor is located in the immediate vicinity of the laser diode on the optical bench.

66. The array in accordance with claim 64, wherein the optical bench has a seat for the temperature sensor.

67. The array in accordance with claim 65, wherein the temperature sensor is located jointly with at least one laser diode on a diode bracket.

68. The array in accordance with claim 64, wherein the temperature sensor has an electrical shunt.

69. The array in accordance with claim 27, wherein the optical bench is enclosed in at least a part of a housing.

70. The array in accordance with claim 69, wherein the housing is hermetically sealed.

71. The array in accordance with claim 69, wherein the housing has a passage for the optical fiber and the optical fiber is enclosed by a fiber sleeve in the area of this passage.

72. The array in accordance with claim 71, wherein the optical fiber is attached to the fiber sleeve and the fiber sleeve to the passage by means of a hermetic seal.

73. The array in accordance with claim 71, wherein the optical fiber is attached to the fiber sleeve and the fiber sleeve is attached to the passage by means of at least one of cementing, soldering, welding, bonding, clamping and press fitting.

74. The array in accordance with claim 73, wherein the optical fiber is curved between the area of the first end surface of the optical fiber and the passage through the housing because the element holder is offset for reasons of adjustment.

75. The array in accordance with claim 69, wherein the housing is filled with an inert gas.

76. The array in accordance with claim 69, wherein a temperature regulating device is located on the outside of the housing for regulating the temperature of the housing.

77. The array in accordance with claim 76, wherein the temperature regulating device has a thermoelectric element, for example, a Peltier element.

78. The array in accordance with claim 69, wherein the optical bench and the temperature regulating device are positioned in the housing in such a way that a gap is provided in the direction of the beam after the step between the underside of the optical bench and the floor of the housing for the purpose of thermally insulating the optical bench from the housing.

79. The array in accordance with claim 69, wherein the housing has:
- a floor of good thermally-conductive metal with a thermal conductivity of more than 100 W(m*K),
- at least four plate-shaped side parts,
- an upper frame, which covers the top edges of the side parts,
- sealed glass passages in at least one side part for electrical connections,
- a passage for the optical fiber in one side part,
- a cover, where the side parts of the housing are brazed to the floor and the upper frame and the cover is attached to the frame either with an additional solder that melts at lower temperature or with an adhesive.

* * * * *